United States Patent [19]
Tanaka et al.

[11] Patent Number: 6,132,862
[45] Date of Patent: Oct. 17, 2000

[54] MAGNETO-OPTICAL RECORDING MEDIUM

[75] Inventors: Shintaro Tanaka, Tokyo; Takashi Shimouma, Kanagawa; Ariyoshi Nakaoki, Tokyo; Masahiko Kaneko, Kanagawa, all of Japan

[73] Assignee: Sony Corporation, Tokyo, Japan

[21] Appl. No.: 08/178,369

[22] Filed: Jan. 6, 1994

Related U.S. Application Data

[63] Continuation of application No. 07/883,779, May 15, 1992, abandoned.

[30] Foreign Application Priority Data

May 16, 1991 [JP] Japan ................................ 3-111843
May 29, 1991 [JP] Japan ................................ 3-126234

[51] Int. Cl.$^7$ ........................................................ G11B 5/66
[52] U.S. Cl. .................. 428/332; 428/336; 428/694 ML; 428/694 MM; 428/694 DE; 428/694 RL; 428/900; 369/13
[58] Field of Search ................... 428/694 ML, 694 MM, 428/694 DE, 694 RL, 332, 336, 900; 369/13

[56] References Cited

U.S. PATENT DOCUMENTS 5,309,427 5/1994 Matsumato ................................ 369/13

FOREIGN PATENT DOCUMENTS

| | | |
|---|---|---|
| 258978 | 3/1988 | European Pat. Off. . |
| 352548 | 1/1990 | European Pat. Off. . |
| 63-52354 | 3/1988 | Japan . |
| 63-52355 | 3/1988 | Japan . |
| 2-24801 | 1/1990 | Japan . |
| 2-121103 | 5/1990 | Japan . |
| 3-86947 | 4/1991 | Japan . |

*Primary Examiner*—Legzek Kiliman
*Attorney, Agent, or Firm*—Hill & Simpson

[57] ABSTRACT

A magneto-optical recording medium comprising a light-transmitting substrate 1 on which a dielectric layer 2, a memory layer 3 having perpendicular magnetic anisotropy, an intermediate layer 4 having in-plane magnetic anisotropy or slight perpendicular magnetic anisotropy, a recording layer 5 having perpendicular magnetic anisotropy, a dielectric layer 6, a metal layer 7, and a protective layer 8 are formed in a stacked form, the recording medium adapted to be magnetized for recording by a process comprising the step of modulating a first thermal condition and a second thermal condition according to a recording signal, wherein a stacked film 9 composed of the memory layer 3, the intermediate layer 4 and the recording layer 5 has a total thickness of from 1000 to 1500 Å, the dielectric layer 6 has a thickness of from 500 to 1500 Å, and the metal layer 7 has a thickness of from 250 to 1500 k. The magneto-optical recording medium permits a recording laser light to be used with an increased power margin, without causing any increase in the laser power level. Where the thickness of the memory layer is set in the range from 20 to 70 nm, an enhanced reproduction signal output is obtained.

2 Claims, 7 Drawing Sheets

MAGNETO-OPTICAL RECORDING MEDIUM

This is a continuation of application Ser. No. 07/883,779, filed May 15, 1992 now abandoned.

BACKGROUND OF THE INVENTION

This invention relates to magneto-optical (or thermo-magnetic) recording media, and particularly to a magneto-optical recording medium comprising a three-layered magnetic film.

In general, thermo-magnetic (or magneto-optical) recording of information on a recording medium designed for reading the information bits (magnetic domains) through a magneto-optical interaction is carried out as follows. The recording medium, having a magnetic thin film capable of perpendicular magnetization, is preliminarily subjected to a so-called initializing treatment, namely, a treatment for aligning the magnetization directions into one sense perpendicular to the film plane. Thereafter, the magnetic thin film is locally heated by irradiation with a laser beam or other means to form magnetic domains which have a perpendicular magnetization in the opposite sense to the initialized magnetization-direction, whereby information is recorded as two-valued information bits.

In the thermo-magnetic recording method as above, rewriting of information must be preceded by a process for erasing recorded information, which process corresponds to the aforementioned initialization. According to the method, therefore, a certain period of time for erasing is needed prior to rewriting, and it is impossible to record information at a high transfer rate. To overcome this problem, there have been proposed a variety of methods based on the so-called overwrite system which does not need time for such an independent erasing process. Some of the thermo-magnetic recording methods based on the overwrite system are regarded as promising. For example, a method in which a modulated magnetic field is externally applied to the recording medium (external field modulation method) and a method in which an erasing head is used in addition to a recording head (two-head method) have been known.

According to the external field modulation a recording medium comprising an amorphous ferrimagnetic thin film having an easy axis of magnetization perpendicular to the film plane is irradiated with a heating beam, and a magnetic field with a polarity corresponding to the condition of an input digital signal current is applied to the irradiated region of the recording medium, thereby recording.

This type of magneto-optical recording media generally comprise a light-transmitting substrate formed of polycarbonate or the like, a dielectric layer provided on the substrate, a magnetic layer formed on the dielectric layer, and a protective layer or the like provided on the magnetic layer. The recording medium is irradiated with a reading light from the transparent substrate side, so as to read the magnetization of each magnetic domain in the irradiated area by utilizing the Kerr effect. An aluminum (Al) layer may be provided between the magnetic layer and the protective layer, either as a film for reflecting the reading light or in order to enhance the Kerr effect.

However, there has been a tendency not to provide such aluminum (Al) layer in a magneto-optical recording medium having a perpendicular magnetization film as a magnetic layer for magneto-optical recording and designed for reading of recorded information through the Kerr effect on the reflection at the film itself, or in a magneto-optical recording medium in which the thickness of a magnetic layer for magneto-optical recording is large, as in light intensity modulation overwrite type recording media, or the like. The reason is that the aluminum layer, if provided, would produce a heat-radiating effect to thereby lead to a lowered recording density. The magneto-optical recording media which are not provided with such aluminum layer, on the other hand, may suffer the problem of corrosion (pitting) of the magnetic layer due to erosion from the protective layer side.

In order to solve the above-mentioned problems, the present inventors have previously proposed a magneto-optical recording medium in which a protective layer on a magnetic layer for magneto-optical recording, i.e. magneto-optical recording layer, is covered by a resin protective layer, with a 25 to 200 Å thick aluminum thin film interposed therebetween, in Unexamined Japanese Patent Publication HEI 3-86947. One example of the magneto-optical recording medium is shown, in schematic enlarged section, in FIG. 8. As shown in the figure, the magneto-optical recording medium comprises a light-transmitting substrate 1 formed of polycarbonate or the like on which a dielectric layer 2 of $Si_3N_4$ or the like, a magneto-optical recording film 13 formed of TbFeCo or the like corresponding to the aforementioned stacked film, and, further, a protective film 16 composed, for instance, of a $Si_3N_4$ or other dielectric layer, an aluminum (Al) thin film 17 and a resin protective film 18, e.g. a UV-curable resin layer, are stacked.

Thus, the Al thin film 17 with 25–200 Å thickness is provided between the protective film 16 and the resin protective film 18, so as to obviate the erosion from the side of the resin protective film 18 and to prevent the lowering of S/N, thereby ensuring an enhanced reliability.

Besides, high-speed recording with a high information transfer rate by the aforesaid external field modulation method requires an electromagnet which operates at a frequency of the order of MHz, for example. Such electromagnet is difficult to prepare and, even if prepared, is not suitable for practical use, because of the great power consumption and heat generation thereof.

On the other hand, the two-head method necessitates an extra head and requires the two heads to be spaced apart. These requirements lead to a heavier burden on drive system, a poorer economy, a lower adaptability to mass-production, etc.

In order to overcome the above difficulties, the present inventors have previously proposed a magneto-optical (or thermo-magnetic) recording method which enables rewriting, or overwriting, to be easily accomplished by only switching in a controlled manner the heating temperature for a recording medium in heating the medium by a laser light or the like, as for example in Japanese Patent Application Laid-Open (KOKAI) Nos. 63-52354 (1988) and 63-52355 (1988). According to the magneto-optical (or thermo-magnetic) recording method proposed by the patent applications, as illustrated in FIG. 6, a magneto-optical (or thermo-magnetic) recording medium having a stacked structure of a first and a second rare earth-transition metal magnetic thin film is used, and a condition in which overwrite recording can be performed is obtained as follows. A first thermal condition which is obtained by heating to a first temperature $T_1$ approximate to or higher than the Curie temperature $Tc_1$ of a memory layer and not so high as to cause inversion of sublattice magnetization in a recording layer, under a first magnetic field applied externally, and a second thermal condition which is obtained by heating to a second temperature $T_2$ equal to or higher than the Curie temperature $Tc_1$ and high enough to cause inversion of the sublattice magnetization in the recording layer, are modulated in a switching manner according the information to be recorded, for example, "0" and "1". In the subsequent cooling process, the senses of sublattice magnetizations in the memory layer are aligned to the senses of sublattice magnetizations in the recording layer due to exchange coupling forces between the memory layer and the recording layer, whereby record bits (magnetic domains) of, for example, "0" and "1" are produced in the memory layer. Furthermore, by a second external magnetic field or by selecting the composition of the recording layer so that the compensation temperature of the recording layer lies between room temperature and the second temperature $T_2$, it is ensured that the sublattice magnetization in the recording layer can be inverted by only the first magnetic field applied at room temperature.

In this case, no special process (time) for erasing is required, and it is possible to attain a higher transfer rate and to solve the aforementioned problems involved in the two-head system or the external field modulation system.

The present inventors, in their Unexamined Japanese Patent Publications HEI 2-24801 and HEI 2-121103, have made proposals for controlling the domain wall energy density $\sigma_w$ at room temperature of magnetic domain walls generated between magnetic thin films in the thermo-magnetic recording method. That is, the present inventors have proposed a magneto-optical recording medium in which an intermediate layer having either in-plane magnetic anisotropy or slight perpendicular magnetic anisotropy is provided between a memory layer and a recording layer, so as to stabilize the condition in which the interfacial domain walls exist.

FIG. 9 shows, in schematic enlarged section, one example of the magneto-optical recording medium according to Unexamined Japanese Patent Publication HEI 2-24801. As shown in the figure, the magneto-optical recording medium 10 comprises a light-transmitting substrate 1 of polycarbonate or the like on which a dielectric layer 2, a-stacked film 9 of magnetic thin films, and a protective layer 6 composed, for example, of a dielectric layer are stacked in succession, the stacked film 9 being composed of a first magnetic thin film, or memory layer 3, an intermediate layer 4 and a second magnetic thin film, or recording layer 5.

Recording and reproduction on the recording medium 10 are carried out as follows. Recording of information is carried out by heating to first and second temperatures $T_1$ and $T_2$, similarly to the recording in the thermo-magnetic (or magneto-optical) recording method according to the above Japanese Patent Application Laid-open (KOKAI) No. 63-52354 (1988). The magnetization states of the above memory layer 3 and recording layer 5, corresponding to temperature T, are schematically indicated by arrows in the memory layer 3 and recording layer 5 in FIG. 7. As shown in the figure, information bits, for example "0" and "1", are recorded in the form of state A wherein the senses of magnetization in the memory layer 3 and the recording layer 5 are the same at room temperature $T_R$ and state B wherein the senses of magnetization are opposite, respectively.

This recording method will now be explained in more detail. First, an area being in the state A,-for example, is irradiated with a laser light, while the intensity of the laser light or the irradiation time is modulated under control according to a recording signal so that the temperature T of the area is raised to a first heating temperature $T_1$ approximate to or higher than the Curie temperature $Tc_1$ of the memory layer 3 and not high enough to cause inversion of the magnetization in the recording layer 5 under a desired recording field (external magnetic field) Hex. The heating brings the memory layer 3 into a demagnetized state C. However, when the stacked film is cooled to or below the temperature $Tc_1$ after the heating is finished, the memory layer 3 comes to exhibit magnetization. The stacked film 9 is so designed that, in this instance, the exchange coupling force between the memory layer 3 and the recording layer 5 predominates, thereby conforming the sense of magnetization of the memory layer 3 to the sense of magnetization of the recording layer 5. That is, the state A is generated, whereby an information bit, for example "0", is recorded.

Another heating is to bring the temperature of an area to a second heating temperature $T_2$ higher than the above-described temperature $T_1$ and high enough to cause inversion of the magnetization in the recording layer 5 under the recording magnetic field (external magnetic field) Hex. By such heating, the memory layer 3 loses its magnetization, whereas the magnetization of the recording layer 5 is inverted by the recording field Hex, resulting in state D. When the stacked film 9 is cooled to the temperature $Tc_1$ after the heating is finished, the exchange coupling force between the memory layer 3 and the recording layer 5 brings the memory layer 3 into state E where the magnetization of the memory layer 3 is opposite to the magnetization in the initial state. At this point, an external sub-field Hsub as an initializing magnetic field or sub-field is applied to the recording layer 5 so as to invert the sense of magnetization in only the recording layer 5, which is designed to have a comparatively low coercive force at or around room temperature $T_R$. The result is a magnetization state B wherein a magnetic domain wall is present between the memory layer 3 and the recording layer 5; that is, the sense of magnetization in the memory layer 3 is solely inverted, as compared to the magnetization state A, whereby an information bit, for example "1", is recorded.

Thus, in the magneto-optical recording medium having the above-described construction, the bits of information "0" and "1" are recorded in the form of state A and state B, respectively. The magnetization directions (or senses) can be detected through the Kerr rotation upon irradiation with a reading laser light.

Both of the state A and state B are capable of being overwritten by a light intensity modulation system. That is, a given area of the magneto-optical recording medium is capable of being overwritten with any one of the state A and the state B according to the information bits "0" and "1", by the process of selectively heating the area to the temperature $T_1$ or $T_2$ for causing the area to pass through at least the state C, in the same manner as described above, irrespective of whether the initial state of the given area is the state A or the state B.

In the magneto-optical recording medium constructed as above, an exchange energy is acting at the interface between the memory layer 3 and the recording layer 5 stacked on each other; therefore, a magnetic domain wall MW is generated in the first state B. The domain wall energy aw is given by the following formula (1):

$$\sigma_w \approx 2((A_1 K_1)^{1/2} + (A_2 K_2)^{1/2}) \tag{1}$$

where $A_1$ and $A_2$ are the exchange constants, and $K_1$ and $K_2$ the perpendicular magnetic anisotropy constants, of the memory layer 3 and the recording layer 5, respectively.

The conditions necessary for overwriting are represented by the following formulas. First, the condition necessary for preventing a transition from state B to state A at room temperature (−20° C. to 60° C.) is given by the following formula (2):

$$Hc_1 > Hw_1 = \sigma_w / 2Ms_1 h_1 \quad (2)$$

Next, the condition of the following formula (3) must be satisfied, in order to prevent a transition from state B to state E.

$$Hc_2 > Hw_2 = \sigma_w / 2Ms_2 h_2 \quad (3)$$

Further, in order that the magnetization of the memory layer 3 in state E may not be inverted by the external sub-field Hsub, the following formula (4) must be satisfied:

$$Hc_1 \pm Hw_1 > Hsub \quad (4)$$

where the plus-or-minus sign (±) on the left side is "+" for the case where the memory layer 3 is a rare earth metal-dominant film and the recording layer 5 is a transition metal-dominant film, and "−" for the case where both the memory layer 3 and the recording layer 5 are transition metal-dominant films.

On the other hand, in order to cause a transition from state E to state B, the following formula (5) must be satisfied.

$$Hsub > Hc_2 + Hw_2 = Hc_2 + \sigma w / 2Ms_2 h_2 \quad (5)$$

For a transition from state C to state A, namely, for alignment of the sense of magnetization-of the memory layer 3 into the sense of magnetization of the recording layer 5, under a heating temperature in the vicinity of the Curie temperature $Tc_1$ of the memory layer 3, the condition of the following formula (6) must be fulfilled.

$$Hw_1 > Hc_1 + Hex \quad (6)$$

Further, in order for a transition from state C to state E to be inhibited, the condition of the following formula (7) must be satisfied.

$$Hc_2 - Hw_2 > Hex \quad (7)$$

Moreover, in order that the magnetization of the memory layer 3 may not be inverted by the external sub-field Hsub at the time of the transition from state E to state B, the condition of the following formula (8) must be fulfilled.

$$Hsub < Hc_1 - Hw_1 = Hc_1 - \sigma_w / (2Ms_1 h_1) \quad (8)$$

In each of the above formulas, $Hw_1$ and $Hw_2$ are effective magnetic fields due to the exchange coupling forces as defined in the above formulas (1) and (2); $Hc_1$ and $Hc_2$, $Ms_1$ and $Ms_2$, and $h_1$ and $h_2$ represent the coercive force, the saturation magnetization and the thickness of the memory layer 3 and the recording layer 5, respectively.

As is clearly understood from the above, it is desirable for the domain wall energy $\sigma_w$ to have a lower value in order to satisfy the above formulas (2) and (3), through actual values of the domain wall energy $\sigma_w$ are considerably high. Also, it is seen from the above formulas (5) and (7) that the external sub-field Hsub increases with an increase in the film thickness $h_2$ of the recording layer 5.

According to this method, in which information is recorded in terms of magnetization state of the memory layer 3, the magnetostatic coupling between the memory layer 3 and the recording layer 5 through the intermediate layer 4 having in-plane magnetic anisotropy or slight perpendicular magnetic anisotropy reduces the domain wall energy $\sigma_w$ between the memory layer 3 and the recording layer 5. It is therefore possible to reduce the external sub-field Hsub necessary for the transition from state E to state B, namely, for initialization of the recording layer 5, and to reduce the total thickness of the stacked film 9.

In carrying out the two-valued information recording as above, it is necessary to heat selectively to the first temperature $T_1$ and second temperature $T_2$ according to the information to be recorded. In the light intensity modulation system, therefore, the temperature distribution in the area heated should be controlled appropriately. The control has been made in the prior art by regulating the irradiating laser power only. With the magneto-optical recording medium, however, there has been the drawback that the tolerance or margin for a high-output-level laser power PH and a low-output-level laser powert PL set for individual recording of each information bit in two-valued information recording is comparatively small.

Meanwhile, as to the light modulation type magneto-optical recording media, a construction has been proposed in which a metal layer is provided on a dielectric protective film covering a magneto-optical recording film on the side opposite to the substrate side, and further a dielectric layer and a UV-curable resin film are stacked on the metal layer [A. Okamuro, et al., MORIS (MO Recording International Symposium), 18-T-13, 199]. This magneto-optical recording medium, as shown in schematic enlarged section in FIG. 8, comprises a light-transmitting substrate 1 on which a dielectric layer 2, a magneto-optical recording film 13, a dielectric layer 6A, a metal layer 7, a dielectric layer 6B and a protective layer 8 are provided in a sequentially stacked form.

In the magneto-optical recording medium, the metal layer 7 formed on the magneto-optical recording film 13, with the dielectric layer 6A interposed therebetween, serves for heat radiation to thereby moderate the temperature variation in the recording film 13 at the time of irradiation with laser light, and to enlarge the margin in setting the power of the irradiating laser light. According to the proposed construction, the thickness of the magneto-optical recording film 13 is 1000 Å, the thickness of the metal layer 7 is 200 Å, and the thicknesses $t_1$ and $t_2$ of the dielectric layers 6A and 6B are 100 Å each, so as to achieve efficient transfer of the heat generated in the recording film 13 by irradiation with laser light to the metal layer 7. As a consequence of the construction, however, there is a possibility that the laser light power necessary for heating to the desired temperature $T_1$ or $T_2$ in the two-valued information recording may be increased.

Besides, because this type of thermo-magnetic recording medium is irradiated with laser light from the side of the memory layer 3, unintended observation of the recording layer 5 through the memory layer 3 can occur, according to the film thickness of the memory layer 3. Therefore, it has been necessary to select the thickness of the memory layer 3 so as to enable assured discrimination between the above-described state E and state B.

SUMMARY OF THE INVENTION

It is accordingly an object of this invention to provide a magneto-optical recording medium which overcomes the aforementioned problems associated with the prior art.

According to a first aspect of this invention, there is provided a magneto-optical recording medium as illustrated in schematic enlarged section in FIG. 1. The magneto-optical recording medium according to the first aspect of this invention comprises a light-transmitting substrate 1 on which a dielectric layer 2, a memory layer 3 having perpendicular magnetic anisotropy, an intermediate layer 4 having in-plane magnetic anisotropy or slight perpendicular magnetic anisotropy, a recording layer 5 having perpendicular magnetic anisotropy, a dielectric layer 6, a metal layer 7, and a protective layer 8 are provided in a successively stacked form, said magneto-optical recording medium adapted to be magnetized for recording information signals by a process comprising the steps of: modulating a first thermal condition and a second thermal condition according to the information signals to be recorded, said first thermal condition obtained by heating to a temperature $T_1$ approximate to or higher than the Curie temperature $Tc_1$ of said memory layer 3 and not so high as to cause inversion of magnetic moment in said recording layer 5, and said second thermal condition obtained by heating to a temperature $T_2$ equal to or higher than said Curie temperature $Tc_1$ and high enough to cause inversion of magnetic moment in said recording layer 5; and cooling from the thermal conditions, wherein the stacked film 9 composed of said memory layer 3, said intermediate layer 4 and said recording layer 5 has a total thickness of from 1000 to 1500 Å, said dielectric layer 6 has a thickness of from 500 to 1500 Å, and said metal layer 7 has a thickness of from 250 to 1500 Å.

As described above, in the magneto-optical recording medium according to the first aspect of this invention, the total thickness of the stacked film 9 is from 1000 to 1500 Å, the thickness of the dielectric layer 6 is from 500 to 1500 Å, and the thickness of the metal layer 7 is from 280 to 1500 Å. With this construction it is possible to enlarge the margin or tolerance for the laser light power levels set for recording of two-valued information, for example "0" and "1", as described above.

In the light intensity modulation type recording methods according to the prior art, the metal layer of high thermal conductivity, if provided, has been made to have a comparatively small thickness, for assured control of temperature setting according to two-valued information by irradiation with laser light as described above. As a result of the present inventors' studies, however, it has been found possible to set the thickness of the metal layer at a comparatively large value, without causing an increase in the laser power required, by suitably selecting the total thickness of the stacked magnetic film for magneto-optical recording as well as the thickness of the dielectric layer interposed between the stacked film and the metal-layer.

With the magneto-optical recording medium according to the first aspect of this invention, therefore, it is possible to enlarge the power margins for high-output-level and low-output-level laser powers PH and PL necessary for individual recording of two-valued information, without need to increase the laser powers themselves.

A magneto-optical recording medium according to a second aspect of this invention will now be explained. According to the second aspect of this invention, there is provided a magneto-optical recording medium for use in a magneto-optical recording process for magneto-optical recording media having at least a memory layer 3 and a recording layer 5 stacked on and magnetically coupled with each other which comprises the steps of: modulating a first thermal condition and a second thermal condition according to information signals to be recorded, said first thermal condition obtained by heating to a temperature $T_1$ approximate to or higher than the Curie temperature $Tc_1$ of said memory layer and not so high as to cause inversion of magnetic moment in said recording layer 5, and said second thermal condition obtained by heating to a temperature $T_2$ equal to or higher than said Curie temperature $Tc_1$ and high enough to cause inversion of magnetic moment in said recording layer 5; and cooling from each said thermal condition, to thereby produce a record in the form of magnetizations in said recording media 10, wherein the thickness of said memory layer 3 of said magneto-optical recording medium is in the range from 20 to 70 nm.

In the magneto-optical recording medium according to the second aspect of this invention, also, the recording of two-valued information "1" and "0", for example, is carried out by forming the state A and state B, as has been described above with reference to FIGS. 3 and 4.

As has been described above, in the magneto-optical recording medium according to the second aspect of this invention, the thickness d of the memory layer 3 is set in the range from 20 to 70 nm. By selecting the film thickness in this range, it has become possible to enlarge the Kerr rotation angle of a reproducing laser light in the state B shown in FIGS. 6 and 7. Thus, it has become possible to increase the difference in Kerr rotation angle between the state A and the state B; in other words, it is possible to enlarge the reproduction outputs of, for example, "1" and "0".

FIG. 5 shows the calculated variations in Kerr rotation angle with varying film thickness of the memory layer 3 in the magneto-optical recording medium. In the figure, the solid curve B represents the variation in the case where the memory layer 3 is in the aforementioned state B; and the dotted curve E, in the aforementioned state E, for comparison. The magneto-optical recording medium under consideration here had been produced to have a light-transmitting substrate 1, a dielectric layer 2 thereon, a stacked film of memory, intermediate and recording layers 3, 4 and 5 provided on the dielectric layer 2, and a dielectric layer 6 formed on the stacked film, as shown in FIG. 1 (except that protective layer 8 and metal layer 7 were omitted), and the Kerr rotation angle observed through the substrate 1 and the dielectric layer 2 was calculated.

As is seen from FIG. 5, the Kerr rotation angle measured through the memory layer 3 in state E is substantially constant, independent of the thickness of the memory layer 3, for thickness values above a certain value. On the other hand, the Kerr rotation angle measured through the memory layer 3 in state B varies depending on the thickness of the memory layer 3, with high angle values being obtained for the thickness range from 20 to 70 nm, and a maximum angle being obtained at a thickness of about 40 nm.

Here, the magnetization direction in the state A is opposite to the magnetization direction in the state E, and the Kerr rotation angle observed in the state A can be regarded as of equal magnitude but opposite polarity to the Kerr rotation angle in the state E. Therefore, according to the magneto-optical recording medium of the second aspect of this invention, in which the thickness of the memory layer is set in the range from 20 to 70 nm so that the Kerr rotation angle in state B represented by the solid curve B in FIG. 5 is greater than the Kerr rotation angle in state E represented by the dotted curve E, it is possible to obtain a large difference between the level of signal "1" and the level of signal "0", resulting in a greater magneto-optical reproduction signal.

DETAILED DESCRIPTION OF THE PREFERRED EMBODIMENTS

Embodiment 1

Figure 1:
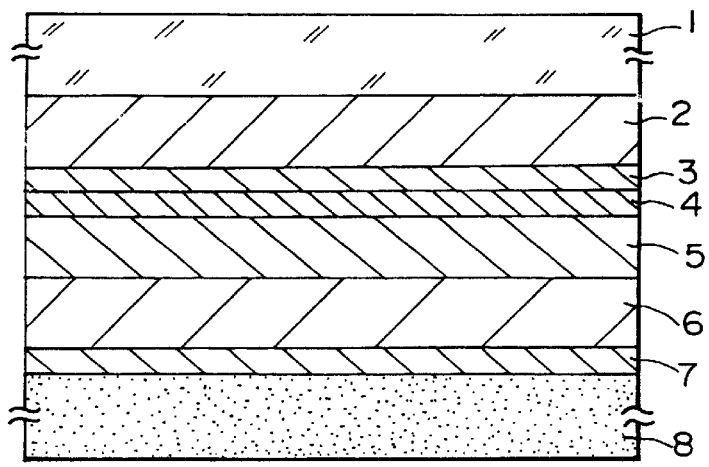
FIG. 1 is a schematic, enlarged sectional view of a magneto-optical recording medium according to one embodiment of this invention.

The magneto-optical recording medium according to the first aspect of this invention will now be explained in detail with reference to one embodiment thereof. This embodiment is applied to a magneto-optical recording medium for overwrite magnetic recording of the light intensity modulation type as described with reference to FIG. 7 above. In this embodiment, as shown in FIG. 1, a light-transmitting substrate 1 formed in the shape of a disk from polycarbonate or the like is coated successively with a dielectric layer 2 of SiN or the like, a memory layer 3 of TbFeCoCr or the like, an intermediate layer 4 of GdFeCoCr or the like, a recording layer 5 of GdTbFeCoCr or the like, a dielectric layer 6 of SiN or the like, and a metal layer 7 of Al or the like, for example by sputtering techniques, and further a protective layer 8 of a UV-curable resin or the like is provided on the metal layer 7. A magneto-optical. recording medium with such construction was produced in which the dielectric layer 2 was made to be 800 Å in thickness, the memory layer 3 was 300 Å, the intermediate layer 4 was 300 Å, the recording layer 5 was 700 Å, the dielectric layer 6 was 800 Å, and the metal layer 7 was 300 Å in thickness.

Figure 2:
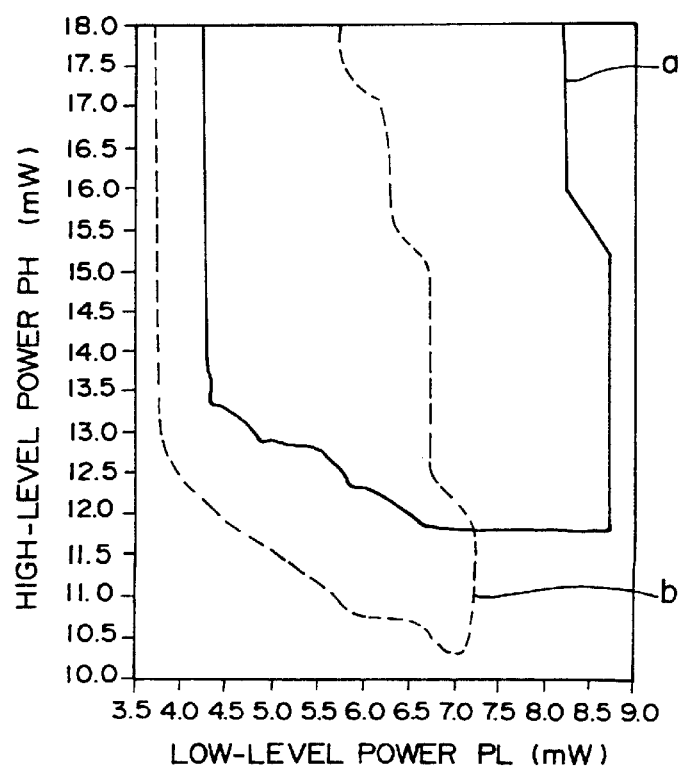
FIG. 2 is a diagram showing a power margin for a recording laser used with the magneto-optical recording medium.

FIG. 2 shows the region in which the power at the time of recording on a light intensity modulation type magneto-optical recording medium can be set, namely, the power margin. The term "power margin" used herein means the region in which direct overwriting can be performed with an error rate of $1 \times 10^{-4}$ or below. In the light intensity modulation recording system, as has been described above, recording of two-valued information is carried out by setting two laser power levels suitable for heating to different temperatures $T_1$ and $T_2$, respectively. The higher-level laser power will be referred to as PH, and the lower-level laser power as PL.

In FIG. 2, the region surrounded by solid line a represents the power margin for the magneto-optical recording medium according to the first aspect of this invention, having the construction as described above. The region surrounded by broken line b, on the other hand, represents the power margin for a magneto-optical recording medium presented as a comparative example, having the same construction as above except that the protective layer 8 is provided directly on the dielectric layer 6, with no metal layer therebetween. For each of the examples, recording of random pattern data according to ISO standards (2.7) RLL (Run Length Limited), or so-called 2.7 modulation system, was carried out under the conditions of a recording magnetic field Hex of 400 Oe, an external magnetic sub-field Hsub of 2.5 kOe, and a linear velocity of 7.5 m/s on a track at a 30-mm distance from the center of the disk-form magneto-optical recording medium.

As seen from FIG. 2, the allowable range of low-level power-PL in the embodiment of this invention, surrounded by the line a, is broader than that in the comparative example, surrounded by the line b. Therefore, with the magneto-optical recording medium according to this embodiment, a comparatively large power margin can be provided for the low-level power PL, similarly to that for the high-level power PH. In the comparative example lacking the metal layer 7, on the other hand, the allowable range of the low-level power PL is small and, accordingly, a large power margin cannot be provided.

Figure 3:
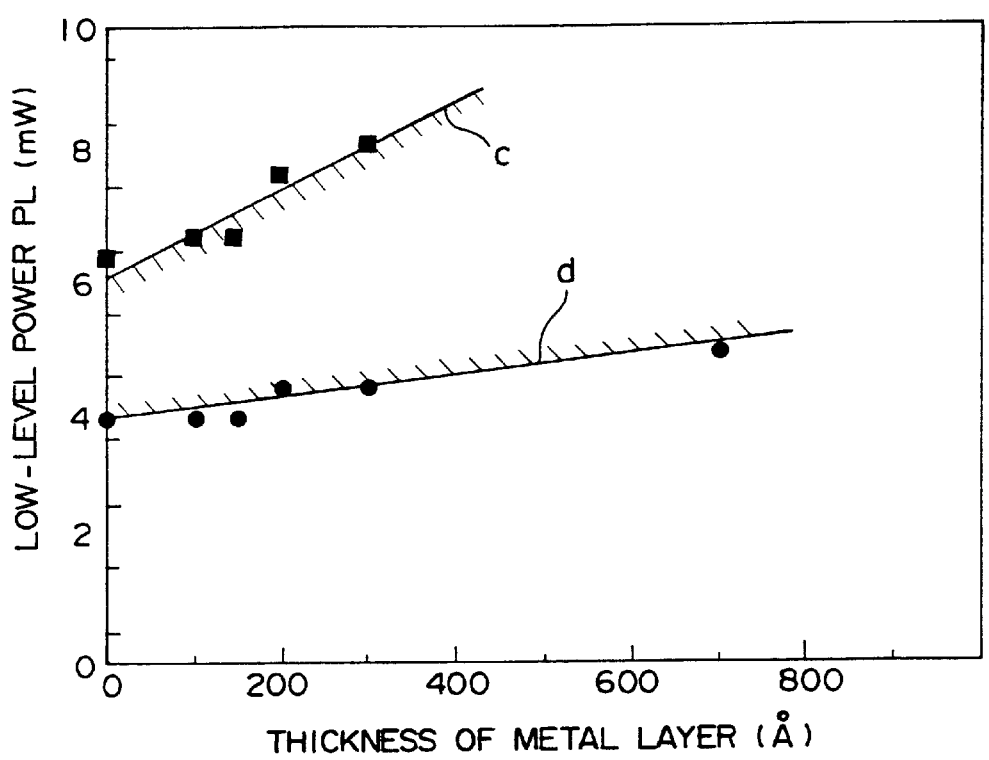
FIG. 3 is a diagram showing variations in the power of a low-level laser with the thickness of a metal layer.

The dependence of the margin for low-level power PL on film thickness is shown in FIG. 3. FIG. 3 shows marginal values of low-level power PL measured on the magneto-optical recording media as shown in FIG. 1, with the thickness of the metal layer 7 varied. For the measurement, the same recording method as described with reference to FIG. 2 above was used. The region bounded by the lines c and d in the figure represents the PL power margin. As seen from FIG. 3, when the metal layer 7 was not provided, the allowable range of low-level power PL was from 3.8 to 6.3 mW, so that the PL power margin was about 2 mW. When an Al metal layer 7 was formed in a thickness of 300 Å, on the other hand, the allowable range of low-level power PL was from 4.3 to 8.2 mW, giving a PL power margin of about 5 mW. The power margin gradually increased in proportion to the thickness of the metal layer 7, as seen from FIG. 3.

Figure 4:
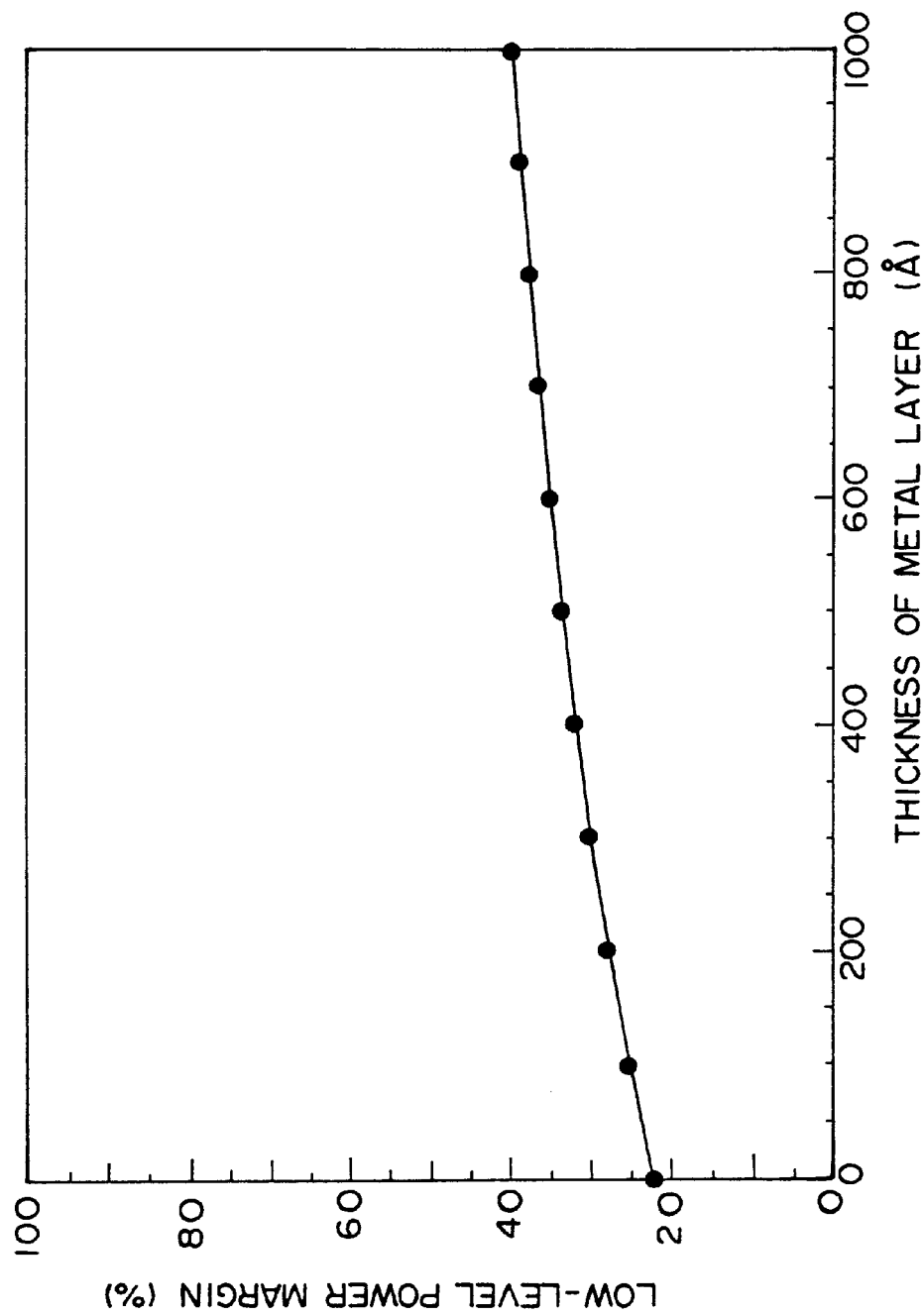
FIG. 4 is a diagram showing variations in the power margin for the low-level laser with the thickness of the metal layer.

For each given value of the film thickness, the average of the marginal PL power values was calculated, to determine the margin provided above and below the average of low-level power PL. The results are shown in FIG. 4. As seen from FIG. 4, only a power margin of about 20% was obtained when the metal layer was absent. It is also seen that the metal layer 7 should have a film thickness of more than about 280 Å, in order to provide a practically required power margin of more than about 30%.

If the thickness of the metal layer 7 exceeds 1500 Å, on the other hand, the heating to a predetermined temperature may be impossible to achieve in recording, for example, on an outer circumference portion of a disk-shaped magneto-optical recording medium, because of the high linear velocity at that portion; consequently, sensitivity may be lowered. Therefore, the thickness of the metal layer should be from about 280 Å to about 1500 Å.

Incidentally, according to the above-mentioned Unexamined Japanese Patent Publication HEI 3-86947, it was difficult to enlarge the power margin and it was impossible to obtain the practically needed power margin of more than about 30%.

In the above embodiment, the film thickness of the dielectric layer 6 was 800 Å. If the film thickness is less than 500 Å, the resulting small spacing between the stacked film 9 (composed of the memory layer 3, intermediate layer 4 and recording layer 5) and the metal layer 7 may develop a lowering in sensitivity, due to radiation of heat by the metal layer 7, and may cause oxidation of the stacked film 9. Where the film thickness is more than 1500 Å, it may be impossible to obtain the effect of enlarging the power margin by the metal layer 7. Therefore, the thickness of the dielectric layer 6 is set in the range from 500 to 1500 Å.

Although the thickness of the stacked film 9 was 1300 Å in the above embodiment, the film thickness may have any value in the range from about 1000 Å to about 1500 Å.

Besides, the intermediate layer 4 was formed by use of GdFeCoCr in the above embodiment. Where the material for the intermediate layer 4 is so selected as to provide a low domain wall energy at room temperature and a high domain wall energy in the vicinity of the Curie point of the material, the selection is so made that the saturation magnetization Ms of the material at room temperature may be in the range of $0 \leq Ms \leq 450$ emu/cm$^3$. Especially, a rare earth-predominant metallic material which has a perpendicular magnetic anisotropy of $1 \times 10^6$ erg/cm$^3$ or below and has a temperature characteristic curve of effective magnetic anisotropy constant K showing an upwardly protuberant form or a linear form may be used. For example, where a GdFeCo material is used, the material is so selected as to have a composition $Gd_x(Fe_{1-y}Co_y)_{1-x}$, wherein x and y are atomic fractions in the range of $0.25 \leq x \leq 0.40$ and $0 \leq y \leq 1.0$, respectively. Where a GdFeCo material is used, a variety of other elements such as Dy, Tb, Nd, etc. may be added to the material. When the material for the intermediate layer 4 is specified in this manner, the magneto-optical recording method described with reference to FIG. 7 above can be performed with a lowered external sub-field Hsub, a simplified apparatus and assured rewriting (overwrite recording) of information.

While the above embodiment has been described with reference to the case of using Al to form the metal layer 7, other materials having a comparatively high thermal conductivity, such as Au, Pt and Cu, may also be used for forming the metal layer 7.

As a material for the dielectric layer 6, various materials other than the above-mentioned SiN may be used, for example, SiO, $SiO_2$, $TiO_2$, TiO, Ceo, $HfO_2$, BeO, $ThO_2$, $Si_3N_4$, ITO, etc.

As has been described above, the magneto-optical recording medium according to the first aspect of this invention comprises the stacked film 9 for magneto-optical recording, the dielectric layer 6 and the metal layer 7, and the thickness of each layer is selected suitably. It is thereby possible to enlarge the power margins for a high-level laser power PH and a low-level laser power PL used, for example, according to two-valued information in magneto-optical recording, without increasing the output values of the powers PH, PL.

Embodiment 2

The magneto-optical recording medium according to the second aspect of this invention will now be explained in detail, in terms of one embodiment thereof and with reference to FIG. 1. This embodiment is applied to magneto-optical recording media in which a memory layer 3 and a recording layer 5, both having perpendicular magnetic anisotropy, together with an intermediate layer 4 therebetween having in-plane magnetic anisotropy or slight perpendicular magnetic anisotropy are stacked in the state of being magnetically coupled successively to form a stacked film 9.

As shown in FIG. 1, a transparent dielectric film 2 of silicon nitride or the like, a memory layer 3 of $Tb(Fe_{95}Co_5)$ or the like, an intermediate layer 4 of $Gd(Fe_{95}Co_5)$ or the like, a recording layer 5 of $GdTb(Fe_{70}Co_{30})$ or the like, and a transparent dielectric layer 6 of silicon nitride or the like were successively formed by sputtering or other techniques on a disk-shaped light-transmitting substrate 1 formed of polycarbonate or the like, to fabricate a disk-form magneto-optical recording medium. The dielectric film 2 was formed to be 80 nm in thickness, the intermediate layer 4 was 20 nm, the recording layer 5 was 70 nm, and the dielectric layer 6 was 50 nm in thickness.

The magneto-optical recording medium thus obtained was rotated at a rate of 2400 rpm, and a reproduction output at a radial distance of 40 mm from the center of the substrate 1 was measured. Prior to the measurement of the reproduction output, a signal with a frequency of 5.0 MHz was recorded on the magneto-optical recording medium under the conditions of a recording external magnetic field Hex of 500 Oe, an external magnetic sub-field Hsub of 4.0 kOe, a high-level laser power of 16.0 mW, and a low-level laser light power of 6.0 mW. The magneto-optical recording medium in a totally erased condition, namely, the state A in FIGS. 6 and 7 was subjected to recording without application of an initializing field, i.e. the external sub-field Hsub. As a result, the state E was generated. Also, recording accompanied by application of the external sub-field Hsub was carried out to give the state B. The measurement of reproduction output was carried out on both the recorded signals in state E and the recorded signals in state B, to compare the reproduction outputs from the two kinds of recording.

In the above magneto-optical recording medium, the thickness d of the memory layer 3 was 30 nm. This magneto-optical recording medium gave a reproduction output from the state E with a C/N of 50.77 dB, and a reproduction output from the state B with a C/N of 51.20 dB. Thus, an about 0.5 dB improvement in C/N was achieved.

Embodiment 3

A magneto-optical recording medium was produced in the same manner as above except that the thickness d of the memory layer 3 was 60 nm. This recording medium gave a reproduction output from the state E with a C/N of 49.37 dB, and a reproduction output from the state B with a C/N of 49.47 dB, which indicates an about 0.1 dB improvement in C/N.

As is clear from these results, by setting the thickness of the memory layer 3 in the range from about 20 to about 70 nm it is possible to produce a greater reproduction output from the state B. Accordingly, it is possible to enlarge the difference between the reproduction output from the state B and the reproduction output from the state A, which exhibits a Kerr rotation angle equal in magnitude and opposite only in polarity to the Kerr rotation angle on the state E.

Figure 7:
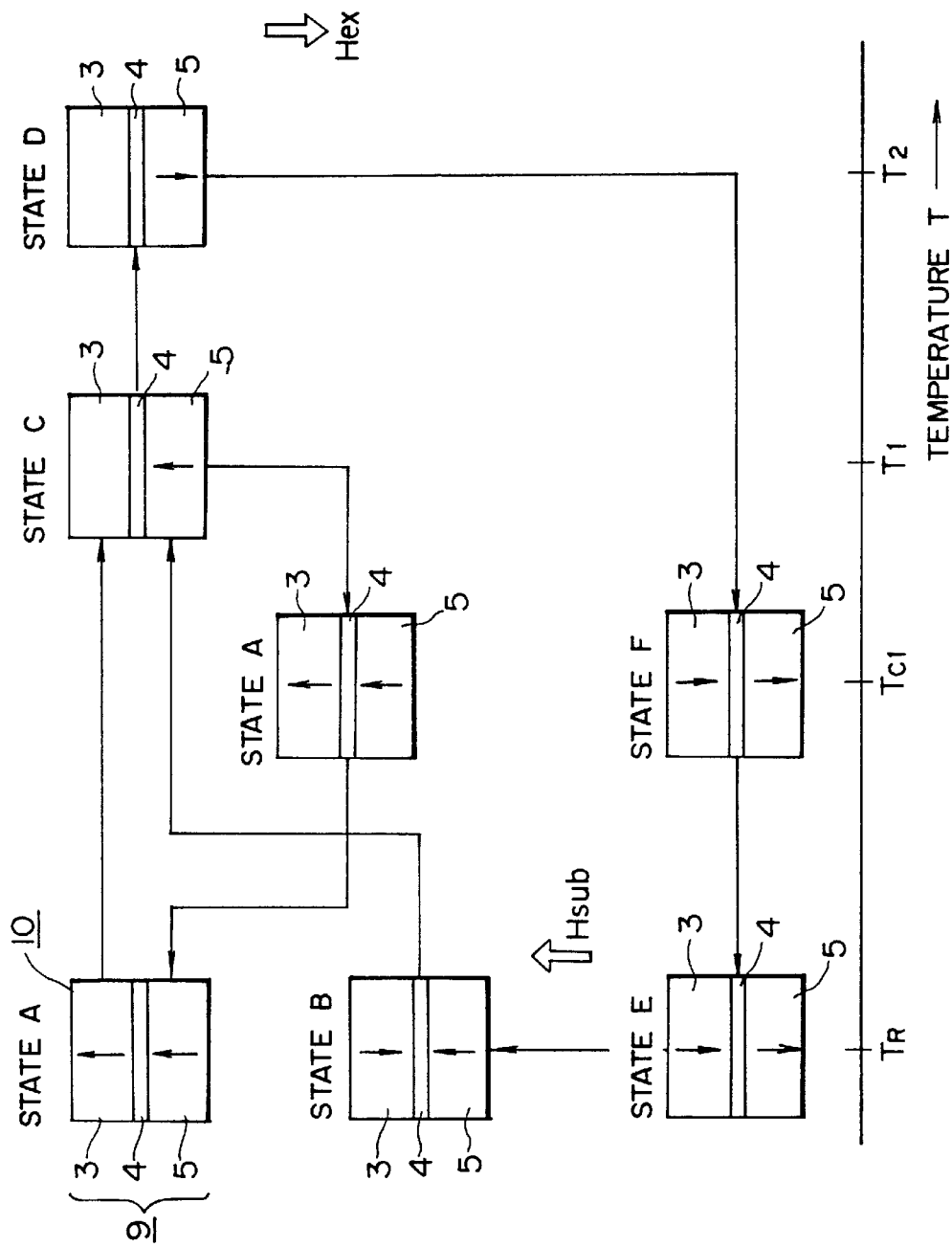
FIG. 7 is a diagrammatic illustration of magnetization states of a stacked film in a magneto-optical recording medium according to the prior art.
Figure 8:
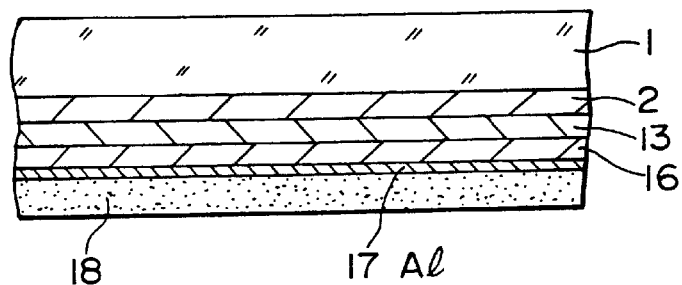
FIG. 8 is a schematic, enlarged sectional view of a magneto-optical recording medium according to the prior art.
Figure 9:
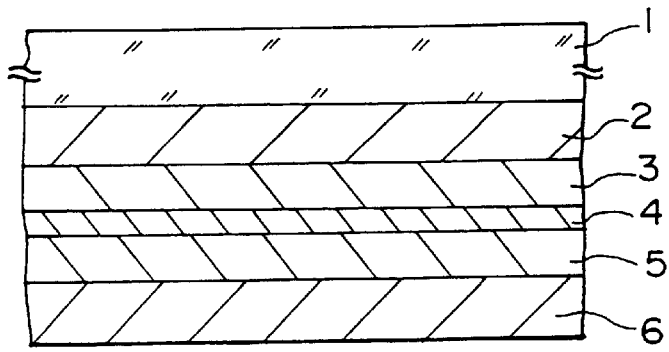
FIG. 9 is a schematic, enlarged sectional view of another magneto-optical recording medium according to the prior art.
Figure 10:
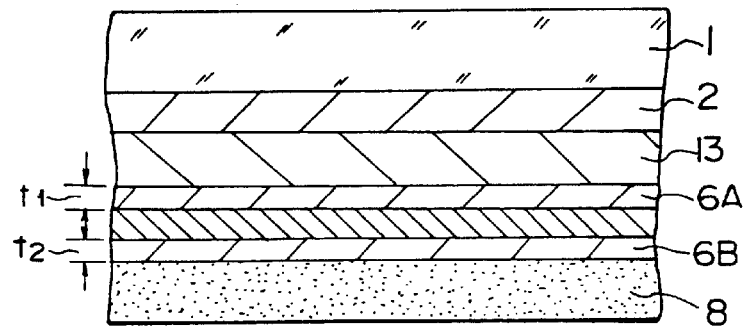
FIG. 10 is a schematic, enlarged sectional view of a further magneto-optical recording medium according to the prior art.

The magneto-optical recording media according to the prior art have not been given a limitation or specification as to the thickness of the memory layer but have been restricted only by the condition for transition from state C to state A in FIG. 7, as represented by the above formula (2), and by the condition for the memory layer 3 at the time of transition from state E to state B, as represented by the above formula (8). On the other hand, the magneto-optical recording medium according to this invention, as described above, is based on the consideration of the dependency of Kerr rotation angle on the thickness of the memory layer 3 as explained above with reference to FIG. 5. Consequently, this invention enables an optimized selection of the thickness of the memory layer 3, thereby leading to a greater reproduction output.

Figure 5:
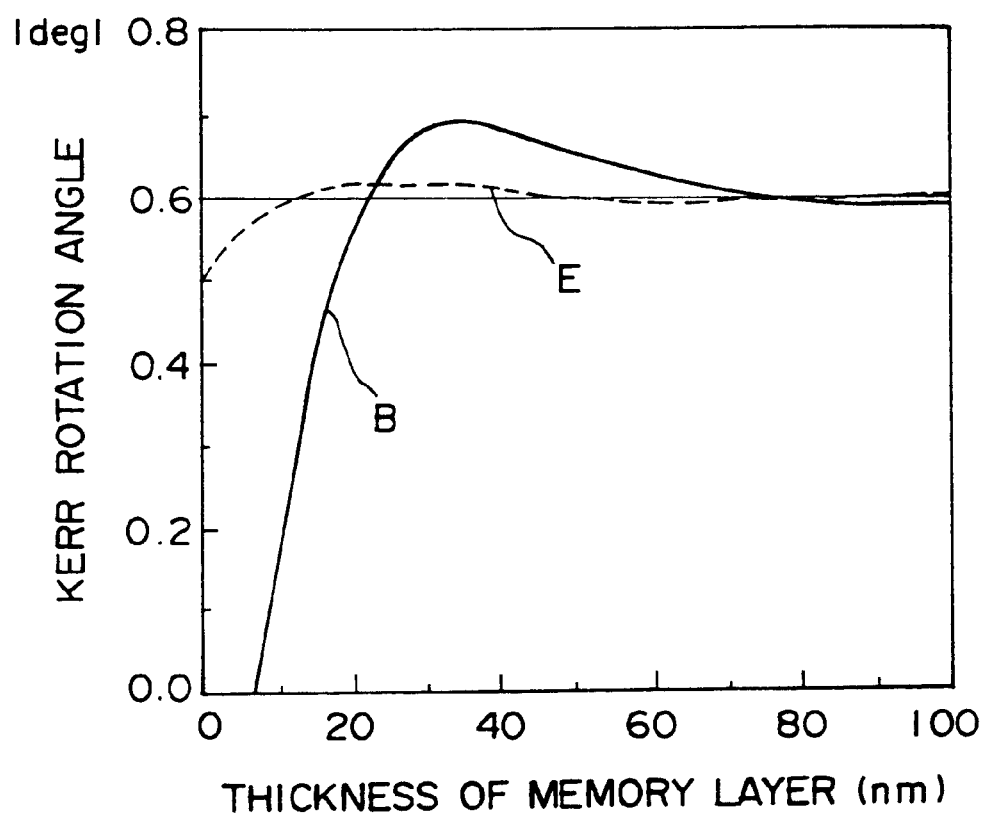
FIG. 5 is a diagram showing the relationship between the thickness of the memory layer in the magneto-optical recording medium and the Kerr rotation angle.

The diagram in FIG. 5 above shows that the thickness d of the memory layer 3 may be set in the range from 20 to 70 nm. Practically, however, it is desirable to set the film thickness d in the range from 20 nm to about 55 nm, in consideration of laser power, etc. for achieving assured overwrite recording (or rewriting).

It should be understood that this invention is not limited to or by the above embodiments and is also applicable to other magneto-optical recording media varying in component materials and construction, for instance, a two-layered film medium having a memory layer 3 and a recording layer 5 in direct contact with each other, and so on.

Figure 6:
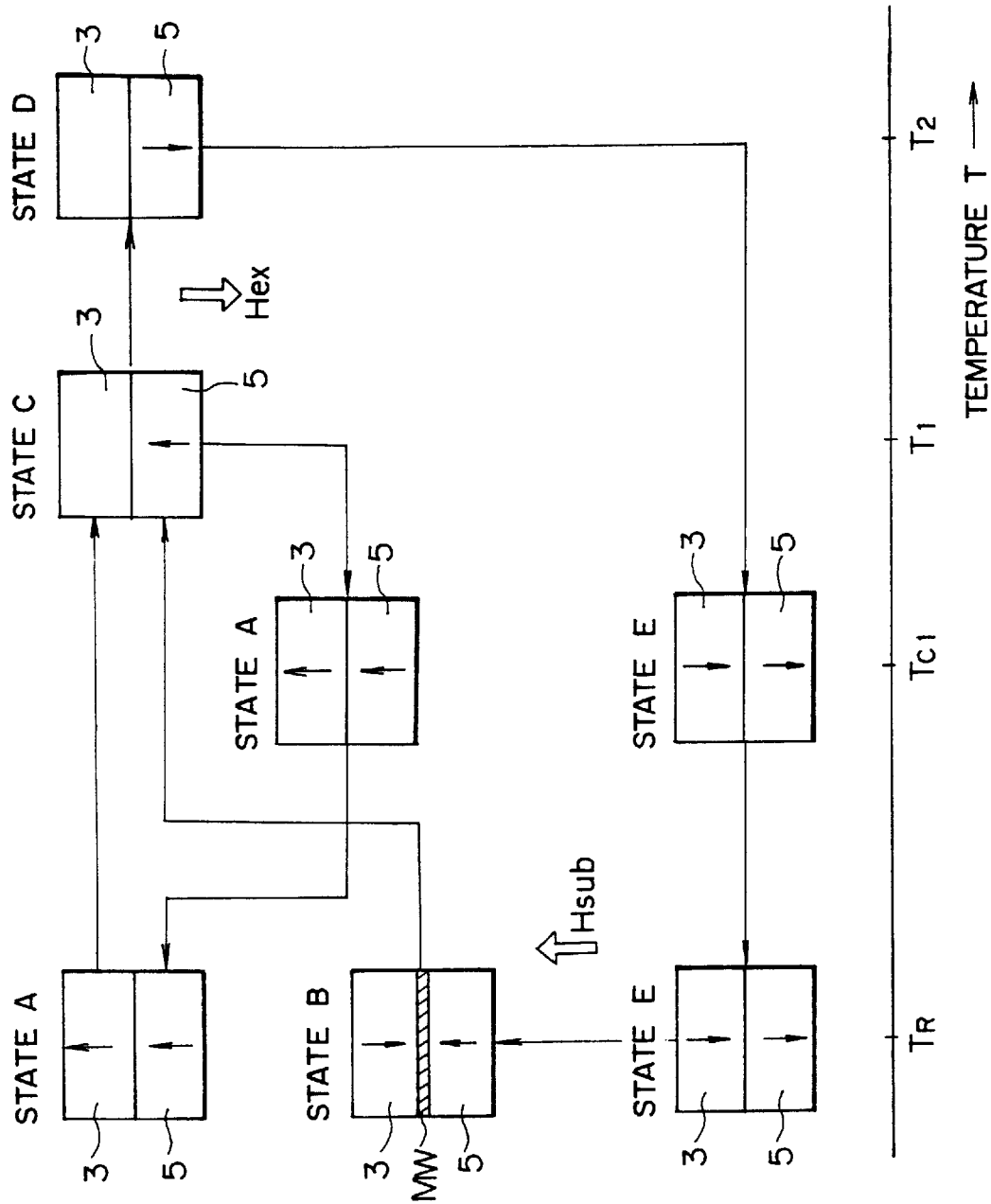
FIG. 6 is a diagrammatic illustration of magnetization states of the magneto-optical recording medium according to this invention.

As has been described above, the magneto-optical recording medium of this invention enables light intensity modulation type overwrite recording to be carried out with an increased reproduction output from the state B in FIGS. 6 and 7, with more assured discrimination between state A and state B, and with enhanced reliability.

Although various minor changes and modifications might be proposed by those skilled in the art, it will be understood that we wish to include within the scope of the patent warranted hereon, all such changes and modifications as reasonably come within our contribution to the art.

What is claimed is:

1. A magneto-optical recording medium, comprising:

a magneto-optical recording medium comprising a light-transmitting substrate on which are applied in successively stacked form a first dielectric layer, a memory layer having perpendicular magnetic anisotropy at room temperature, an intermediate layer having in-plane magnetic anisotropy at room temperature, a recording layer having perpendicular magnetic anisotropy at room temperature, a second dielectric layer, a metal layer, and a protective layer;

a stacked film composed of said memory layer, said intermediate layer, and said recording layer having a total thickness of from 1000 to 1500 Å;

said second dielectric layer having a thickness of from 500 to 1500 Å; and said metal layer having a thickness from 280 to 1500 Å.

2. A magneto-optical recording medium, comprising:

a magneto-optical recording medium comprising a light-transmitting substrate on which are applied in successively stacked form a first dielectric layer, a memory layer having perpendicular magnetic anisotropy at room temperature, an intermediate layer having slight perpendicular magnetic anisotropy at room temperature, a recording layer having perpendicular magnetic anisotropy at room temperature, a second dielectric layer, a metal layer, and a protective layer;

a stacked film composed of said memory layer, said intermediate layer, and said recording layer having a total thickness from 1000 to 1500 Å;

said second dielectric layer having a thickness of from 500 to 1500 Å; and said metal layer having a thickness from 280 to 1500 Å.

* * * * *